United States Patent
Tomizawa

(10) Patent No.: US 8,296,050 B2
(45) Date of Patent: Oct. 23, 2012

(54) NAVIGATION DEVICE

(75) Inventor: Katsumi Tomizawa, Chofu (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 688 days.

(21) Appl. No.: 12/526,785

(22) PCT Filed: Feb. 22, 2008

(86) PCT No.: PCT/JP2008/053024
§ 371 (c)(1),
(2), (4) Date: Aug. 12, 2009

(87) PCT Pub. No.: WO2008/105329
PCT Pub. Date: Sep. 4, 2008

(65) Prior Publication Data
US 2010/0094539 A1    Apr. 15, 2010

(30) Foreign Application Priority Data
Feb. 28, 2007   (JP) ................................. 2007-048910

(51) Int. Cl.
*G01C 21/00* (2006.01)

(52) U.S. Cl. .......... 701/201; 701/28; 701/408; 701/411; 701/414; 701/422; 701/423; 701/465; 340/988; 340/989; 340/992; 340/994; 340/996

(58) Field of Classification Search .......... 701/1, 23–26, 701/28, 400–472; 340/901, 904, 988–996
See application file for complete search history.

(56) References Cited

U.S. PATENT DOCUMENTS

| | | | | |
|---|---|---|---|---|
| 5,904,727 | A * | 5/1999 | Prabhakaran | 701/454 |
| 6,124,810 | A * | 9/2000 | Segal et al. | 340/994 |
| 6,317,060 | B1 * | 11/2001 | Jones | 340/994 |
| 2002/0022923 | A1 * | 2/2002 | Hirabayashi et al. | 701/200 |
| 2002/0053985 | A1 * | 5/2002 | Nesbitt | 340/994 |
| 2003/0233190 | A1 * | 12/2003 | Jones | 701/207 |
| 2005/0043885 | A1 * | 2/2005 | Amlinger | 701/204 |
| 2005/0251330 | A1 * | 11/2005 | Waterhouse et al. | 701/204 |

(Continued)

FOREIGN PATENT DOCUMENTS

JP   2003-156342   5/2003

(Continued)

OTHER PUBLICATIONS

International Preliminary Examination Report (Application No. PCT/JP2008/053024) dated Sep. 11, 2009.

(Continued)

*Primary Examiner* — Jonathan M Dager
(74) *Attorney, Agent, or Firm* — Eric J. Robinson; Robinson Intellectual Property Law Office, P.C.

(57) ABSTRACT

A navigation device (100) has a position detection section (7), an interface (4), a touch panel (62), and a computer (1). The computer (1) has timekeeper means for clocking a current time, estimated arrival time calculation means for calculating the estimated time of arrival at a destination by using the touch panel (62), mail creation instruction means for causing, through the interface, (4) a portable telephone (200) to create mail containing text that informs arrival at the calculated estimated time of arrival, and mail transmission instruction means for causing the portable telephone (200) to transmit the created mail. The estimated time of arrival is transmitted to the other party without operation of a portable telephone by a driver.

2 Claims, 1 Drawing Sheet

U.S. PATENT DOCUMENTS

| | | | |
|---|---|---|---|
| 2006/0164259 A1* | 7/2006 | Winkler et al. | 340/944 |
| 2006/0217885 A1* | 9/2006 | Crady et al. | 701/213 |
| 2006/0290533 A1* | 12/2006 | Horstemeyer | 340/994 |
| 2007/0288163 A1* | 12/2007 | Meyer et al. | 701/211 |
| 2008/0275643 A1* | 11/2008 | Yaqub et al. | 701/209 |

FOREIGN PATENT DOCUMENTS

| | | |
|---|---|---|
| JP | 2004-242154 | 8/2004 |
| JP | 2005-127949 | 5/2005 |
| JP | 2006-078430 | 3/2006 |
| JP | 2007-078507 | 3/2007 |

OTHER PUBLICATIONS

Written Notification of Reason for Refusal (Application No. 2007-048910) dated Nov. 22, 2011.

International Search Report for PCT/JP2008/053024.

* cited by examiner

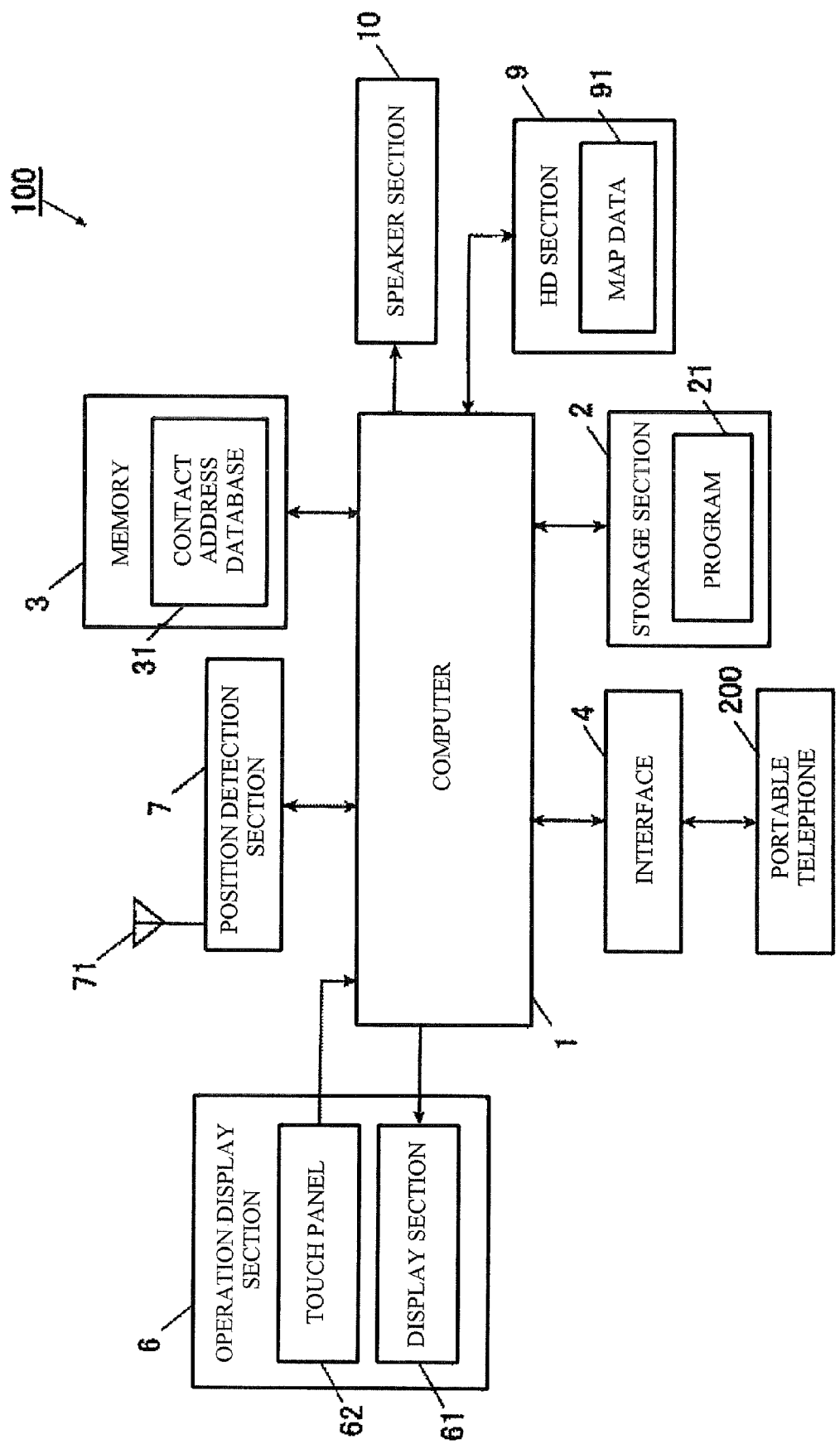

NAVIGATION DEVICE

TECHNICAL FIELD

The present invention relates to a navigation device.

BACKGROUND ART

Conventionally, there is an on-board navigation device to which a portable telephone is connected as an external device, in which it is well known that such navigation devices are mounted on two or more automobiles to communicate between the navigation devices using functions of the portable telephone (refer to patent document 1).
Patent document 1: Japanese Patent Application Laid-Open No. 2003-109185

DISCLOSURE OF THE INVENTION

Problems to be Solved by the Invention

However, though it was possible to communicate between navigation devices using a portable telephone, a portable telephone connected to a navigation device could not communicate with another portable telephone not connected to a navigation device. That is, in order that a car driver might notify a delay, an estimated time of arrival and a present address to a person residing at a destination, it was required for the driver to operate the portable telephone to contact the other party by telephone or by electronic mail.

Thus, it is an object of the invention to transmit an estimated time of arrival to another party without operation of a portable telephone by a driver.

Means for Solving the Problems

In order to accomplish the above object, an aspect of the invention provides a navigation device comprising a display section, an interface for communicating with a portable device, a position detection section for detecting a current position, a destination input section for inputting a destination, and a computer having means for displaying a map image containing the current position detected by the position detection section on the display section, the computer comprising timekeeper means for clocking a current time, estimated arrival time calculation means for calculating an estimated time of arrival at a destination input by the destination input section based on the current time clocked by the timekeeper means, mail creation instruction means for causing, through the interface, the portable device to create a mail containing text that informs arrival at the estimated time of arrival calculated by the estimated arrival time calculation means, and mail transmission instruction means for causing the portable device to transmit the mail created in the portable device by the mail creation instruction means.

The invention according to another aspect provides the navigation device above described, wherein the mail creation instruction means causes, through the interface, the portable device to create the mail further containing information on the current position detected by the position detection section.

The invention according to another aspect provides the navigation device above described, wherein the computer further comprises facility retrieval means for retrieving a facility in the surroundings nearest to the current position detected by the position detection means, and the mail creation instruction means causes, through the interface, the portable device to create the mail further containing text indicating that the facility retrieved by the facility retrieval means is at the current position.

The invention according to another aspect provides the navigation device above described, wherein the computer comprises estimated arrival time recalculation means for recalculating the estimated time of arrival at the destination input by the destination input section based on the current time clocked by the timekeeper means, mail creation reinstruction means for causing, through the interface, the portable device to create the mail containing text that informs arrival at the estimated time of arrival calculated by the estimated arrival time recalculation means, and mail transmission reinstruction means for causing the portable device to transmit the mail created in the portable device by the mail creation reinstruction means.

The invention according to another aspect provides the navigation device above described, wherein the computer further comprises determination means for determining whether or not the estimated time of arrival calculated by the estimated arrival time calculation means and the estimated time of arrival recalculated by the estimated arrival time recalculation means are different, and the mail transmission reinstruction means causes the portable device to transmit the mail if the determination of the determination means is different.

The invention according to another aspect provides the navigation device above described, wherein the mail transmission reinstruction means causes the portable device to transmit the mail after the passage of a predetermined time since the mail transmission instruction means causes the portable device to transmit the mail.

The invention according to another aspect provides the navigation device above described, wherein the computer further comprises second facility retrieval means for retrieving a facility in the surroundings nearest to the current position detected by the position detection means, and the mail creation reinstruction means causes, through the interface, the portable device to create the mail further containing text indicating that the facility retrieved by the second facility retrieval means is at the current position.

The invention according to yet a further aspect provides a navigation device comprising a display section, an interface for communicating with a portable device, a position detection section for detecting a current position, a destination input section for inputting a destination, and a computer having means for displaying a map image containing the current position detected by the position detection section on the display section, the computer comprising timekeeper means for clocking a current time, estimated arrival time calculation means for calculating an estimated time of arrival at a destination input by the destination input section based on the current time clocked by the timekeeper means, mail creation means for creating a mail containing text that informs arrival at the estimated time of arrival calculated by the estimated arrival time calculation means, and mail transmission means for causing, through the interface, the portable device to transmit the mail created by the mail creation means.

Effects of the Invention

With the invention, the estimated time of arrival is calculated by the computer of the navigation device, and the computer instructs the portable device to transmit the mail containing the text that informs arrival at the calculated estimated time of arrival. Therefore, the estimated time of arrival can be transmitted to another party without operation of the portable device by the driver.

BRIEF DESCRIPTION OF THE DRAWINGS

FIG. 1 is a block diagram showing a schematic configuration of a navigation device.

DESCRIPTION OF SYMBOLS 1 computer
2 storage section
3 memory
4 interface
7 position detection section
9 HD section
21 program
62 touch panel
61 display section
100 navigation device
200 portable telephone

BEST MODES FOR CARRYING OUT THE INVENTION

The preferred embodiments for carrying out the present invention will be described below with reference to the drawings. Though the following embodiments impose various restrictions technically preferred for carrying out the invention, the scope of the invention is not limited to the following embodiments and illustrations.

First Embodiment

FIG. 1 is a block diagram showing a schematic configuration of a navigation device 100 according to an embodiment of the invention. The navigation device 100 comprises a computer 1, a storage section 2, a memory 3, an interface 4, an operation display section 6, a position detection section 7, an HD (Hard Disk) section 9 and a speaker section 10, as shown in FIG. 1. This navigation device 100 is mounted mainly on an automobile.

The speaker section 10 is an electro-acoustic transducer. That is, the speaker section 10 converts an audio signal amplified and output by the computer 1 into sound that is output.

The HD section 9 stores map data 91. The map data 91 is composed of a map image associated with latitude and longitude, road data associated with latitude and longitude, and facility information associated with latitude and longitude. A disk drive may be employed instead of the HD section 9. The disk drive has an optical pickup to read recorded information on a portable disk type recording medium. In this case, the map data 91 is stored in the disk type recording medium.

The position detection section 7 has a GPS antenna 71, a GPS unit and a self-contained navigation unit. The position detection section 7 receives a signal at the GPS antenna 71 from a plurality of GPS satellites launched to an earth low orbit, and detects the latitude and longitude at the current position, based on the received signal, with the GPS unit. Moreover, the position detection section 7 detects a direction of travel with a self-contained navigation unit. The position detection section 7 outputs a signal regarding the detected latitude, the detected longitude and the detected direction of travel to the computer 1, whereby the detected latitude, the detected longitude and the detected direction of travel are employed for processing in the computer 1.

The operation display section 6 comprises a display section 61 and a touch panel 62.

The display section 61 is a display device such as a liquid crystal display or an electroluminescence display to make the display in accordance with a display signal input from the computer 1. For example, a map around the current position is displayed on the display section 61.

The touch panel 62 is provided on a display screen of the display section 61. The touch panel 62 detects a touched position in accordance with a coordinate reading principle of electromagnetic induction, magnetostriction or pressure sensitive method, and outputs a signal of the touched position to the computer 1. A destination is input from the touch panel 62.

A contact address database 31 is stored in the memory 3. The contact address database 31 has a mail address associated with each registrant.

The storage section 2 is a semiconductor memory or a small hard disk storage device. A program 21 is stored in the storage section 2.

The interface 4 is the interface for communicating with a portable telephone 200 provided outside. The interface 4 may be the interface conforming to the USB standards, or an infrared communication device (e.g., infrared communication device in conformance to the IrDA standards). The portable telephone 200 has a function of transmitting or receiving electronic mail.

The computer 1 reads the program 21 from the storage section 2, and functions as the following means in accordance with the program.

The computer 1 functions as timekeeper means for clocking the current time.

The computer 1 functions as contact address retrieval means for retrieving the mail address of the selected registrant selected on the touch panel 62 from the contact address database 31 in the memory 3, and address recording means for recording the retrieved mail address of the selected registrant in the memory 3.

Also, the computer 1 functions as map retrieval means for retrieving the map image around the detected latitude and the detected longitude by the position detection section 7 from the map data 91 in the HD section 9, and map display means for displaying the retrieved map image on the display section 61.

Also, if the destination is input on the touch panel 62, the computer 1 functions as path calculation means for calculating the path from the current position in the detected latitude and the detected longitude by the position detection section 7 to the input destination from the map data 91, and guide means for giving guidance by displaying the calculated path together with the map image on the display section 61. Thereby, guidance to the destination is performed by the navigation device 100.

Also, if the destination is input on the touch panel 62, the computer 1 functions as estimated arrival time calculation means for calculating the original estimated time of arrival based on the path calculated by the path calculation means and the current time clocked by the timekeeper means, and estimated time display means for displaying the calculated estimated time of arrival together with the map image on the display section 61.

Also, if the destination is input on the touch panel 62, the computer 1 functions as facility retrieval means for retrieving a facility in the surroundings nearest to the detected latitude and the detected longitude at the current position by the position detection section 7 from the map data 91 in the HD section 9.

Also, if the destination is input on the touch panel 62, the computer 1 functions as mail creation instruction means for causing a portable telephone 200 to create a mail containing text indicating that the facility retrieved by the facility retrieval means is at the current position and text that informs arrival at the original estimated time of arrival calculated by the estimated arrival time calculation means, with a mail address of the selected registrant recorded in the memory 3 by the address recording means as the destination. That is, the mail creation instruction means of the computer 1 comprises creation means for creating a mail containing text indicating that the facility retrieved by the facility retrieval means is at the current position and text that informs arrival at the original estimated time of arrival calculated by the estimated arrival time calculation means, with the mail address of the selected registrant recorded in the memory 3 by the address recording means as the destination, and transfer means for transferring the created mail to the portable telephone 200 and causing the portable telephone 200 to create the mail. Thereby, the mail is temporarily stored in the portable telephone 200.

Also, if a transmission command is input on the touch panel 62, the computer 1 functions as mail transmission instruction means for causing the portable telephone 200 to transmit the mail (i.e., mail transferred by the transfer means) created by the mail creation instruction means.

Also, the computer 1 functions as estimated arrival time recalculation means for recalculating the estimated time of arrival based on the detected latitude and the detected longitude at the current position by the position detection section 7, the path calculated by the path calculation means and the current time clocked by the timekeeper means.

Also, the computer 1 functions as determination means for determining whether or not the original estimated time of arrival calculated by the estimated arrival time calculation means and the estimated time of arrival recalculated by the estimated arrival time recalculation means are different. More specifically, if a difference between the original estimated time of arrival and the recalculated estimated time of arrival is greater than a predetermined threshold value, the computer 1 determines that the original estimated time of arrival and the recalculated estimated time of arrival are different, while if the difference between the original estimated time of arrival and the recalculated estimated time of arrival is less than or equal to the predetermined threshold value, the computer 1 determines that the original estimated time of arrival and the recalculated estimated time of arrival are the same.

If it is determined that both the estimated times of arrival are different, the computer 1 functions as next facility re-retrieval means, mail recreation instruction means and mail retransmission instruction means. That is, the computer 1 functions as facility re-retrieval means for re-retrieving a facility in the surroundings nearest to the detected latitude and the detected longitude at the current position by the position detection section 7 from the map data 91 in the HD section 9. Also, the computer 1 functions as mail recreation instruction means for transferring a mail containing text indicating that the facility re-retrieved by the facility re-retrieval means is at the current position and text that informs arrival at the estimated time of arrival recalculated by the estimated arrival time recalculation means, with the mail address of the selected registrant recorded in the memory 3 by the address recording means as the destination, via the interface 4 to the portable telephone 200 and causing the portable telephone 200 to create the mail. And if a transmission command is input on the touch panel 62, the computer 1 functions as mail retransmission instruction means for causing the portable telephone 200 to retransmit the mail created by the mail recreation instruction means.

Subsequently, the operation of the computer 1 in accordance with the program 21 and the operation of the navigation device 100 will be described below. First of all, the operation at an initial setting will be described below.

If the driver selects the registrant by touching the touch panel 62, the computer 1 retrieves the mail address of the selected registrant from the contact address database 31 in the memory 3.

Next, the computer 1 records the retrieved mail address of the selected registrant in the memory 3. Thereby, the computer 1 sets up the mail address. The driver may directly inputs the mail address by operating the touch panel 62, and the computer 1 may set up the mail address by recording the mail address in the memory 3.

Next, if the driver touches the touch panel 62 to input the destination from the touch panel 62, the computer 1 calculates the path from the current position in the detected latitude and the detected longitude by the position detection section 7 to the input destination from the map data 91.

Next, the computer 1 retrieves the facility in the surroundings nearest to the detected latitude and the detected longitude at the current position by the position detection section 7 from the map data 91 in the HD section 9.

Next, the computer 1 obtains original estimated time of arrival based on the calculated path and the current time. And the computer 1 retrieves the map image around the detected latitude and the detected longitude by the position detection section 7 from the map data 91 in the HD section 9, and displays the retrieved map image together with the calculated path and the original estimated time of arrival on the display section 61.

Afterwards, every time the detected latitude and the detected longitude are detected by the position detection section 7, the computer 1 displays the map image around the detected latitude and the detected longitude together with the path and the original estimated time of arrival on the display section 61 to guide the driver to the destination.

On the other hand, the computer 1 transfers a mail containing text indicating that the facility retrieved in advance is at the current position and text that informs arrival at the estimated time of arrival calculated in advance via the interface 4 to the portable telephone 200 and causes the portable telephone 200 to create the mail. At this time, the computer 1 causes the portable telephone 200 to create the mail with the mail address of the selected registrant recorded in the memory 3 as destination of the mail. The computer 1 may include information on the current position detected by the position detection section 7 in the mail, instead of the text indicating that the facility retrieved in advance is at the current position. The information on the current position detected by the position detection section 7 is the latitude and longitude of the current position detected by the position detection section 7 or address or street name with direction of travel corresponding to the latitude and longitude, and specifically includes text that informs presence at the current position in the mail.

Next, the computer 1 displays a contact icon on the display section 61.

And if the driver touches the touch panel 62 at a part corresponding to the contact icon displayed on the display section 61, a detection signal is input from the touch panel 62 into the computer 1. The computer 1, having received the detection signal as input, outputs a transmission instruction via the interface 4 to the portable telephone 200, so that the mail is transmitted by the portable telephone 200. The computer 1 may make the mail transmission instruction at once without waiting for the driver to touch the touch panel 62.

With the above operation, the estimated time of arrival and the current position of the navigation device 100 are transmitted to the other party at the portable telephone of destination or the like even if the driver does not operate the portable telephone 200. Therefore, the driver can drive safely. Also, the mail recipient of destination can grasp the estimated time of arrival and the current position of the driver by seeing the content of the mail.

Subsequently, the operation of the navigation device 100 when guidance to the destination is performed by the navigation device 100 after the initial setting will be described below.

The computer 1 recalculates the estimated time of arrival, based on the detected latitude and the detected longitude at the current position by the position detection section 7 and the calculated path and current time.

Next, the computer 1 compares the original estimated time of arrival calculated in advance and the recalculated estimated time of arrival. That is, the computer 1 determines whether a difference between the original estimated time of arrival and the recalculated estimated time of arrival is less than or equal to a predetermined threshold value, or greater than the threshold value. As a result of comparison, if the original estimated time of arrival and the recalculated estimated time of arrival are different (the difference is greater than the predetermined threshold value), the computer 1 re-retrieves a facility in the surroundings nearest to the detected latitude and the detected longitude at the current position by the position detection section 7 from the map data 91 in the HD section 9.

Next, the computer 1 transfers a mail containing text indicating that the facility re-retrieved in advance is at the current position and text that informs arrival at the estimated time of arrival recalculated in advance via the interface 4 to the portable telephone 200 and causes the portable telephone 200 to recreate the mail. At this time, the computer 1 causes the portable telephone 200 to recreate the mail with the mail address of the selected registrant recorded in the memory 3 as the destination of the mail. Instead of the text indicating that the facility re-retrieved in advance is at the current position, the computer 1 may include text that informs presence at the current position detected by the position detection section 7 in the mail.

Next, the computer 1 displays the contact icon again on the display section 61. And if the driver touches the touch panel 62 at a part corresponding to the contact icon displayed on the display section 61, a detection signal is input from the touch panel 62 into the computer 1. The computer 1, having received the detection signal as input, re-outputs a transmission instruction via the interface 4 to the portable telephone 200, so that the mail is retransmitted by the portable telephone 200. The computer 1 may make the mail transmission instruction at once without waiting for the driver to touch the touch panel 62.

With the above operation, the estimated time of arrival and the current position of the navigation device 100 are transmitted to the other party at the portable telephone of destination or the like. Therefore, the driver can drive safely. Also, the mail recipient of destination can grasp the estimated time of arrival and the current position of the driver by seeing the content of the mail. In this case, even if the arrival time is going to be late because of heavy traffic on the road, or conversely the arrival time is going to be early because of less traffic on the road, the almost correct estimated time of arrival can be informed to the mail recipient.

As a result of the comparison, if the original estimated time of arrival and the recalculated estimated time of arrival are the same (the difference is less than or equal to the predetermined threshold value), the computer 1 recalculates the estimated time of arrival in the same way, and re-compares the original estimated time of arrival and the recalculated estimated time of arrival. The computer repeats the above operation until the original estimated time of arrival and the recalculated estimated time of arrival are different, and makes the facility re-retrieval if the original estimated time of arrival and the recalculated estimated time of arrival are different.

The description content of this embodiment may be appropriately changed without departing from the spirit or scope of the invention.

<Modification>

Though in the above embodiment the computer 1 functions as the facility re-retrieval means, the mail recreation instruction means and the mail retransmission instruction means if the original estimated time of arrival and the recalculated estimated time of arrival are different, the computer 1 may function as the facility re-retrieval means, the mail recreation instruction means and the mail retransmission instruction means in the following case. That is, in the case where a predetermined time has passed since the mail is transmitted by the portable telephone 200 at the initial setting, or the driver touches the touch panel 62 at a part of the icon displayed on the display section 61 after the initial setting, the computer 1 may function as the facility re-retrieval means, the mail recreation instruction means and the mail retransmission instruction means. In this case, the navigation device 100 and the computer 1 operate in the following way when, guidance to the destination is performed by the navigation device 100 after the initial setting.

The computer 1 determines whether or not the predetermined time passes since the mail is transmitted by the portable telephone 200 at the initial setting, and operates in the following way if it determines that the predetermined time passes. Or the computers 1 determines whether or not the driver touches the touch panel 62 at a part of the icon displayed on the display section 61, and operates in the following way if a detection signal indicating that the part of the icon is touched is input from the touch panel 62.

The computer 1 recalculates the estimated time of arrival based on the detected latitude and the detected longitude at the current position by the position detection section 7 and the calculated path and current time. Next, the computer 1 re-retrieves a facility in the surroundings nearest to the detected latitude and the detected longitude at the current position by the position detection section 7 from the map data 91 in the HD section 9.

Next, the computer 1 transfers a mail containing text indicating that the facility re-retrieved in advance is at the current position and text that informs arrival at the estimated time of arrival recalculated in advance via the interface 4 to the portable telephone 200 and causes the portable telephone 200 to recreate the mail. At this time, the computer 1 causes the portable telephone 200 to recreate the mail with the mail address of the selected registrant recorded in the memory 3 as the destination of the mail. Instead of the text indicating that the facility re-retrieved in advance is at the current position, the computer 1 may include text that informs presence at the current position detected by the position detection section 7 in the mail.

Next, the computer 1 displays the contact icon again on the display section 61. And if the driver touches the touch panel 62 at a part corresponding to the contact icon displayed on the display section 61, a detection signal is input from the touch panel 62 into the computer 1. The computer 1, having received the detection signal as input, outputs a transmission instruction again via the interface 4 to the portable telephone 200, so that the mail is retransmitted by the portable telephone 200.

Afterwards, the computer 1 repeats the above process every time a predetermined time passes, or the driver touches the touch panel 62 at a predetermined icon. Thereby, periodically or every time the driver makes the operation, the estimated time of arrival and the current position of the navigation device 100 are transmitted to the other party at the portable telephone of destination or the like.

Second Embodiment

In the first embodiment, the portable telephone 200 has an electronic mail transmitting/receiving function, and the computer 1 of the navigation device 100 makes an instruction to the portable telephone 200 to transmit the mail. On the contrary, in a second embodiment, the computer 1 of the navigation device 100 causes the portable telephone 200 to transmit the mail using a communication network (internet, portable telephone radio communication network) connection function for the portable telephone 200. In this case, the function of the computer 1 with the program 21 is different from the first embodiment, whereby the function of the computer 1 will be described below.

In the second embodiment, like the first embodiment, the computer 1 functions as clock means, contact address retrieval means, address recording means, map retrieval means, map display means, path calculation means, guide means, estimated arrival time calculation means, estimated time display means, facility retrieval means, estimated arrival time recalculation means and facility re-retrieval means.

However, the computer 1 functions as mail creation means, network connection means and mail transmission means in the following, instead of the mail creation instruction means and the mail transmission instruction means. That is, if the destination is input from the touch panel 62, the computer 1 functions as the mail creation means for creating a mail containing text indicating that the facility retrieved by the facility retrieval means is at the current position and text that informs arrival at the original estimated time of arrival calculated by the estimated arrival time calculation means, with the mail address of the selected registrant recorded in the memory 3 by the address recording means as the destination. The computer 1 functions as network connection means for causing the portable telephone 200 to connect to the communication network by making an instruction to the portable telephone 200 through the interface 4. The computer 1 functions as mail transmission means for causing the portable telephone 200 to transmit the mail created by the mail creation means through the interface 4 in a state where it is connected to the communication network by the network connection means.

Also, instead of the mail recreation instruction means and the mail retransmission instruction means, the computer 1 functions as mail recreation means, network reconnection means and mail retransmission means. That is, the computer 1 functions as the mail recreation means for recreating a mail containing text indicating that the facility re-retrieved by the facility re-retrieval means is at the current position and text that informs arrival at the estimated time of arrival recalculated by the estimated arrival time recalculation means, with the mail address of the selected registrant recorded in the memory 3 by the address recording means as the destination. Also, the computer 1 functions as the network reconnection means for causing the portable telephone 200 to reconnect to the communication network by making an instruction again to the portable telephone 200 through the interface 4. The computer 1 functions as the mail transmission means for causing the portable telephone 200 to transmit the mail created by the mail recreation means through the interface 4 in a state where it is connected to the communication network by the network connection means. If the original estimated time of arrival and the recalculated estimated time of arrival are different, a predetermined time passes since the mail is transmitted through the portable telephone 200 at the initial setting, or the driver touches the touch panel 62 at a part of the icon displayed on the display section 61 after the initial setting, the computer 1 functions as the facility re-retrieval means, the mail recreation means, the network reconnection means and the mail retransmission means.

Next, the operation of the navigation device 100 and the computer 1 will be described below.

The operation since the driver touches the touch panel 62 to select the registrant until the computer 1 displays the map image around the detected latitude and the detected longitude together with the path and the original estimated time of arrival on the display section 61 to guide the driver to the destination is the same as in the first embodiment.

On the other hand, the computer 1 creates a mail containing text indicating that the facility retrieved in advance is at the current position and text that informs arrival at the estimated time of arrival calculated in advance and temporarily stores it. At this time, the computer 1 creates the mail with the mail address of the selected registrant recorded in the memory 3 as the destination of the mail. Instead of the text indicating that the facility retrieved in advance is at the current position, the computer 1 may include information on the current position detected by the position detection section 7 in the mail.

Next, the computer 1 displays the contact icon on the display section 61.

And if the driver touches the touch panel 62 at a part corresponding to the contact icon displayed on the display section 61, a detection signal is input from the touch panel 62 into the computer 1. The computer 1, having received the detection signal as input, makes a network connection instruction via the interface 4 to the portable telephone 200, and is connected to the communication network by the portable telephone 200.

Next, the computer 1 transmits the mail created in advance. Herein, the computer 1 causes the portable telephone 200 to transmit the mail via the interface 4.

Subsequently, the operation of the navigation device 100 when guidance to the destination is performed by the navigation device 100 after the initial setting will be described below.

The computer 1 recalculates the estimated time of arrival based on the detected latitude and the detected longitude at the current position by the position detection section 7 and the calculated path and current time.

And the computer 1 compares the original estimated time of arrival calculated in advance and the recalculated estimated time of arrival, and as a result of comparison, if the original estimated time of arrival and the recalculated estimated time of arrival are different (the different is greater than the predetermined threshold value), the computer 1 operates in the following way. Or the computer 1 determines whether or not a predetermined time passes since the mail is transmitted by the portable telephone 200 at the initial setting, and operates in the following way if it determines that the predetermined time passes. Or the computer 1 determines whether or not the driver touches the touch panel 62 at a part of the icon displayed on the display section 61, and if there is input of a detection signal indicating that the part of the icon is touched from the touch panel 62, the computer 1 operates in the following way.
That is, after the above determination, the computer 1 re-retrieves the facility in the surroundings nearest to the detected latitude and the detected longitude at the current position by the position detection section 7 from the map data 91 in the HD section 9. Next, the computer 1 creates a mail containing text indicating that the facility re-retrieved in advance is at the current position and text that informs arrival at the estimated time of arrival recalculated in advance and temporarily stores it. Next, the computer 1 displays the contact icon on the display section 61. And if the driver touches the touch panel 62 at a part corresponding to the contact icon displayed on the display section 61, a detection signal is input from the touch panel 62 into the computer 1. The computer 1, having received the detection signal as input, makes a network connection instruction via the interface 4 to the portable telephone 200, and is connected to the communication network by the portable telephone 200. Next, the computer 1 transmits the mail created in advance. Herein, the computer 1 causes the portable telephone 200 to transmit the mail via the interface 4.

The invention claimed is:
1. A navigation device comprising:
a display section;
an interface for communicating with a portable device;
a position detection section for detecting a current position;
a destination input section for inputting a destination; and
a computer having means for displaying a map image containing the current position detected by said position detection section on said display section;
said computer comprising:
timekeeper means for clocking a current time;
estimated arrival time calculation means for calculating an estimated time of arrival at a destination input by said destination input section based on the current time clocked by said timekeeper means;
mail creation instruction means for causing, through said interface, said portable device to create a mail containing text that informs arrival at the estimated time of arrival calculated by said estimated arrival time calculation means; and
mail transmission instruction means for causing said portable device to transmit the mail created in said portable device by said mail creation instruction means,
wherein said computer further comprises facility retrieval means for retrieving a facility in the surroundings nearest to the current position detected by said position detection means, and said mail creation instruction means causes, through said interface, said portable device to create the mail further containing text indicating that the facility retrieved by said facility retrieval means is at the current position.

2. A navigation device comprising:
a display section;
an interface for communicating with a portable device;
a position detection section for detecting a current position;
a destination input section for inputting a destination; and
a computer having means for displaying a map image containing the current position detected by said position detection section on said display section;
said computer comprising:
timekeeper means for clocking a current time;
estimated arrival time calculation means for calculating an estimated time of arrival at a destination input by said destination input section based on the current time clocked by said timekeeper means;
mail creation instruction means for causing, through said interface, said portable device to create a mail containing text that informs arrival at the estimated time of arrival calculated by said estimated arrival time calculation means; and
mail transmission instruction means for causing said portable device to transmit the mail created in said portable device by said mail creation instruction means,
wherein said computer comprises estimated arrival time recalculation means for recalculating the estimated time of arrival at the destination input by said destination input section based on the current time clocked by said timekeeper means, mail creation reinstruction means for causing, through said interface, said portable device to create the mail containing text that informs arrival at the estimated time of arrival calculated by said estimated arrival time recalculation means, and mail transmission reinstruction means for causing said portable device to transmit the mail created in said portable device by said mail creation reinstruction means,
wherein said mail transmission reinstruction means causes said portable device to transmit the mail after the passage of a predetermined time since said mail transmission instruction means caused said portable device to transmit the mail, and
wherein said computer further comprises second facility retrieval means for retrieving a facility in the surroundings nearest to the current position detected by said position detection means, and said mail creation reinstruction means causes, through said interface, said portable device to create the mail further containing text indicating that the facility retrieved by said second facility retrieval means is at the current position.

* * * * *